(12) United States Patent
Arimilli et al.

(10) Patent No.: US 6,763,433 B1
(45) Date of Patent: Jul. 13, 2004

(54) HIGH PERFORMANCE CACHE INTERVENTION MECHANISM FOR SYMMETRIC MULTIPROCESSOR SYSTEMS

(75) Inventors: Ravi K. Arimilli, Austin, TX (US); John Steven Dodson, Pflugerville, TX (US); James Stephen Fields, Jr., Austin, TX (US); Guy Lynn Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 09/696,910

(22) Filed: Oct. 26, 2000

(51) Int. Cl.$^7$ .............................................. G06F 12/08
(52) U.S. Cl. ...................... 711/146; 711/145; 711/144; 711/122
(58) Field of Search ................................ 711/141, 144, 711/146, 145, 122, 143, 135, 119, 118, 121, 130, 133, 156, 158, 151, 147, 154, 117, 120, 205

(56) References Cited

U.S. PATENT DOCUMENTS

| | | | |
|---|---|---|---|
| 5,335,335 A | | 8/1994 | Jackson et al. |
| 5,355,467 A | | 10/1994 | MacWilliams et al. |
| 5,369,753 A | | 11/1994 | Tipley |
| 5,737,759 A | | 4/1998 | Merchant |
| 5,784,590 A | * | 7/1998 | Cohen et al. ............... 711/122 |
| 5,809,533 A | | 9/1998 | Tran et al. |
| 5,890,200 A | | 3/1999 | Merchant |
| 5,909,699 A | * | 6/1999 | Sarangdhar et al. ........ 711/146 |
| 5,987,571 A | | 11/1999 | Shibata et al. |
| 5,995,967 A | | 11/1999 | Iacobovici et al. |
| 6,052,760 A | | 4/2000 | Bauman et al. |
| 6,138,217 A | | 10/2000 | Hamaguchi |
| 6,230,260 B1 | | 5/2001 | Luick |
| 6,282,615 B1 | | 8/2001 | Arimilli et al. |
| 6,470,437 B1 | * | 10/2002 | Lyon .......................... 711/207 |
| 6,499,085 B2 | * | 12/2002 | Bogin et al. ................ 711/118 |
| 6,681,293 B1 | * | 1/2004 | Solomon et al. ............ 711/122 |

OTHER PUBLICATIONS

Micro Channel Data Streaming and Input/Output Snooping Facility for Personal Computer Systems, IBM Technical Disclosure Bulletin, vol. 36, Issue 10, pp. 187–193, Oct. 1993.*

Cache Interrogation with Partial Address Directory, IBM Technical Disclosure Bulletin, Vol. 7, Issue 7, pp. 343–344, Jul. 1993.*

"Micro Channel Data Streaming and Input/Output Snooping Facility for Personal Computer Systems", IBM Technical Disclosure Bulletin, vol. 36, Issue 10, pp. 187–192, Oct. 1993.*

"Selective Invalidation Scheme for Software MP Cache Coherence Control", IBM Technical Disclosure Bulletin, vol. 35, Issue 3, pp. 244–246, Aug. 1992.*

"Processor Performance Monitoring With A Depiction Of The Efficiency Of The Cache Coherency Protocol Of Superscalar Microprocessor In An Symmetric Multiple Processor Environment"; IBM TDB, vol. 40, No. 1, Jan. 1997, pp. 79–81 XP000686109.

* cited by examiner

Primary Examiner—Pierre Bataille
(74) Attorney, Agent, or Firm—Casimer K. Salys; Dillon & Yudell LLP

(57) ABSTRACT

Upon snooping an operation in which an intervention is permitted or required, an intervening cache may elect to source only that portion of a requested cache line which is actually required, rather than the entire cache line. For example, if the intervening cache determines that the requesting cache would likely be required to invalidate the cache line soon after receipt, less than the full cache line may be sourced to the requesting cache. The requesting cache will not cache less than a full cache line, but may forward the received data to the processor supported by the requesting cache. Data bus bandwidth utilization may therefore be reduced. Additionally, the need to subsequently invalidate the cache line within the requesting cache is avoided, together with the possibility that the requesting cache will retry an operation requiring invalidation of the cache line.

19 Claims, 5 Drawing Sheets

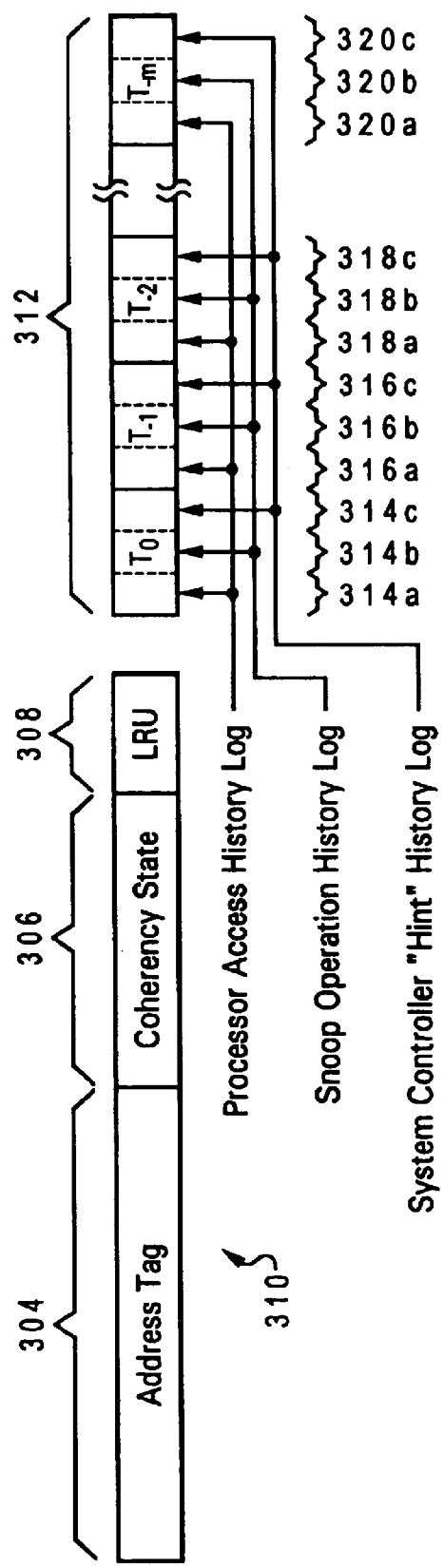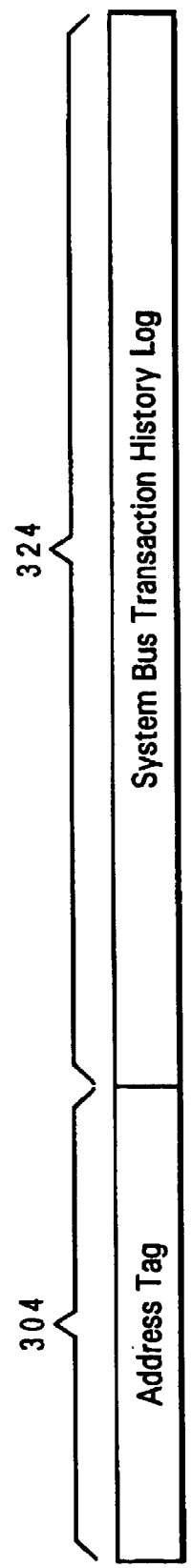
Fig. 3B
Fig. 3C

HIGH PERFORMANCE CACHE INTERVENTION MECHANISM FOR SYMMETRIC MULTIPROCESSOR SYSTEMS

RELATED APPLICATIONS

The present invention is related to the subject matter of commonly assigned, copending U.S. patent applications: Ser. No. 09/696,888 entitled "INTELLIGENT CACHE MANAGEMENT MECHANISM VIA PROCESSOR ACCESS SEQUENCE ANALYSIS"; Ser. No. 09/696,912 entitled "DYNAMIC CACHE MANAGEMENT IN A SYMMETRIC MULTIPROCESSOR SYSTEM VIA SNOOP OPERATION SEQUENCE ANALYSIS"; Ser. No. 09/696,890 entitled "ENHANCED CACHE MANAGEMENT MECHANISM VIA AN INTELLIGENT SYSTEM BUS MONITOR"; Ser. No. 09/696,890 entitled "ENHANCED MULTIPROCESSOR RESPONSE BUS PROTOCOL ENABLING INTRA-CACHE LINE REFERENCE EXCHANGE"; and Ser. No. 09/696,889 entitled "SYMMETRIC MULTIPROCESSOR ADDRESS BUS PROTOCOL WITH INTRA-CACHE LINE ACCESS INFORMATION". The content of the above-identified applications are incorporated herein by reference.

BACKGROUND OF THE INVENTION

1. Technical Field

The present invention generally relates to an improved data processing system and in particular to improved memory management in a data processing system. Still more particularly, the present invention relates to an improved intervention protocol for cache memory management in a data processing system.

2. Description of the Related Art

Multiprocessor systems having multilevel storage hierarchies often support an "intervention", a bus transaction in which a snooper responds to a request for data and sources the data rather than allowing the data to be sourced from the storage device to which the request was addressed. For example, if one level two (L2) cache snoops a read operation initiated by another L2 cache on the system bus directed at system memory, the first L2 cache may intervene in the read operation through a snoop response. The data is then sourced from the snooping cache to the requesting cache.

In a typical intervention scenario, a cache issues a read request on the system bus. Normally, the requested data would be sourced from main memory. With intervention, another cache containing the data may respond and source the data instead of the system memory. Upon seeing this response, the memory controller knows not to source the data, which is instead sourced directly by the intervening cache to the requesting cache via the system bus.

The most commonly supported intervention type is a modified intervention, where "modified" refers to a coherency state within the modified/exclusive/shared/invalid (MESI) coherency protocol. If the first L2 cache described above snoops the read operation and determines that it contains the target cache line in a modified coherency state, the cache will intervene in the snooped operation to satisfy the request and to update the image of the data in system memory, maintaining memory coherency.

Some systems also support a shared intervention, in which the snooping L2 cache has the requested data in a shared coherency state but intervenes and satisfies the request. Typically shared intervention is supported where access latency to system memory is much longer (in processor or bus cycles) than the time required for request/response transactions on the system bus.

An intervention usually returns a full cache line (which may be, for example, 64 bytes) of data. Assuming the system data bus is eight bytes wide, eight bus cycles (or eight "beats") are required to transfer the cache line. However, the requesting cache may only require a portion of the cache line, not the entire cache line, and may indicate this through an intra-cache line address portion of the address driven for the request. Thus, the bus cycles consumed in transferring the portions of the cache line which are not required by the requesting cache are effectively wasted if the remaining portion of the cache line data is unlikely to be required in the near future (before invalidation of the cache line within the requesting cache).

In some situations, an intervening cache may desire to have the requesting cache skip caching of the target data. For example, the intervening cache may predict that it will be modifying the data again shortly, and wish to avoid having to transmit a request to invalidate copies of the data within other caches (i.e., maintaining the cache line in an exclusive state after the intervention).

It would be desirable, therefore, to provide a system improving the "intelligence" of cache management, and in particular to reducing bus bandwidth consumed by interventions and subsequent related operations.

SUMMARY OF THE INVENTION

It is therefore one object of the present invention to provide an improved data processing system.

It is another object of the present invention to provide improved memory management in a data processing system.

It is yet another object of the present invention to provide to an improved intervention protocol for cache memory management in a data processing system.

The foregoing objects are achieved as is now described. Upon snooping an operation in which an intervention is permitted or required, an intervening cache may elect to source only that portion of a requested cache line which is actually required, rather than the entire cache line. For example, if the intervening cache determines that the requesting cache would likely be required to invalidate the cache line soon after receipt, less than the full cache line may be sourced to the requesting cache. The requesting cache will not cache less than a full cache line, but may forward the received data to the processor supported by the requesting cache. Data bus bandwidth utilization may therefore be reduced. Additionally, the need to subsequently invalidate the cache line within the requesting cache is avoided, together with the possibility that the requesting cache will retry an operation requiring invalidation of the cache line.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A–3C depict comparative diagrams of cache and history directory entries in accordance with the prior art and in accordance with the present invention.

DETAILED DESCRIPTION OF THE PREFERRED EMBODIMENT

Figure 1:
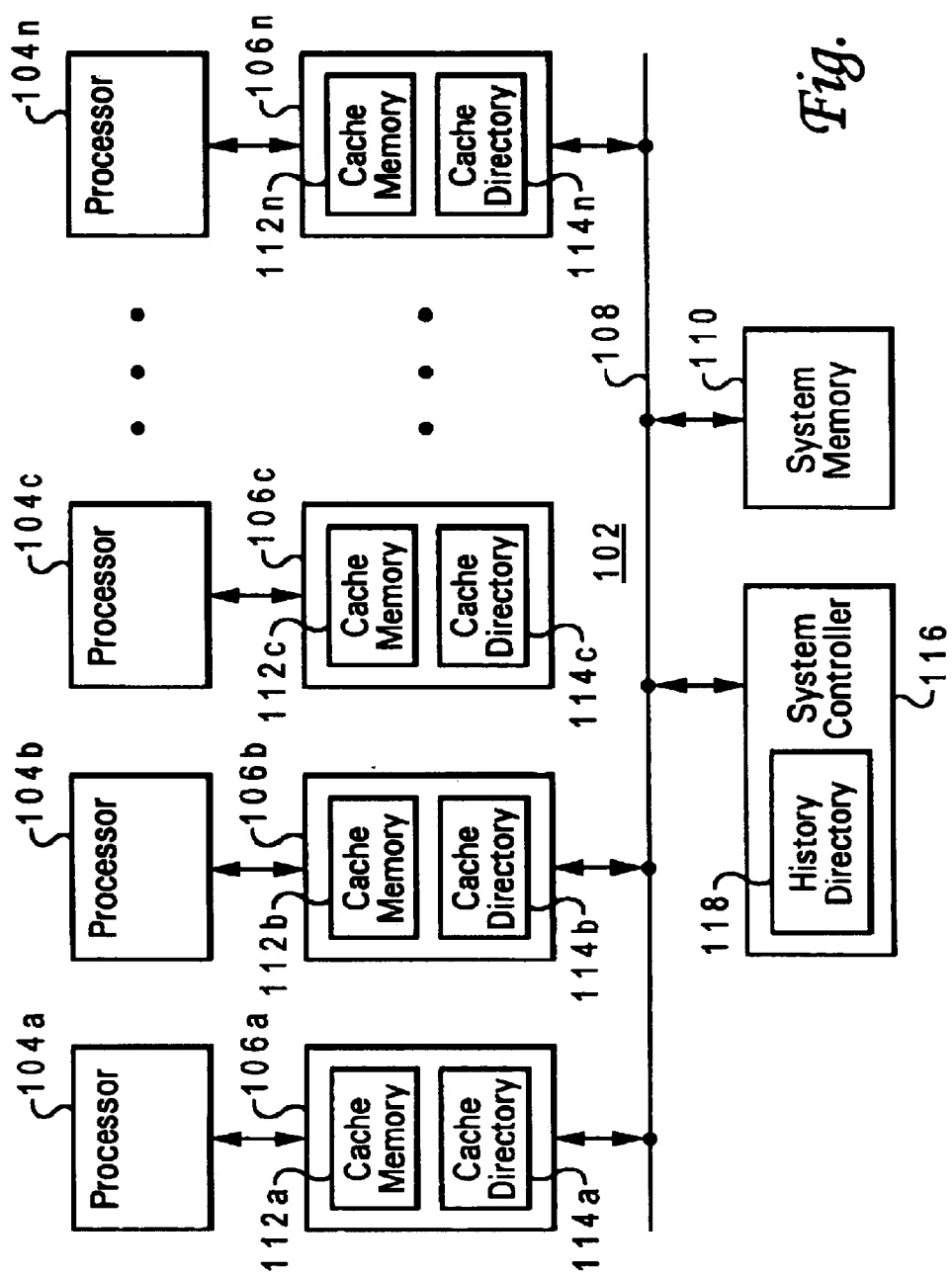
FIG. 1 depicts a multi-processor data processing system in accordance with a preferred embodiment of the present invention.

With reference now to the figures and in particular with reference to FIG. 1, a high level block diagram of a multi-processor data processing system in accordance with a preferred embodiment of the present invention is depicted. Data processing system 102 includes a plurality of processors 104a–104n (where n is any positive integer). Data processing system 102 also includes a number of caches 106a–106n between the processors 104a–104n and a system bus 108, which couples processors 104a–104n and caches 106a–106n to system memory 110 under the control of system controller 116.

Caches 106a–106n each include a cache memory and cache directory, and may be shared or private, logically in-line or look-aside, and inclusive or noninclusive caches within the present invention. Processors 104a–104n are each coupled to system memory 110 via system bus 108. In a tightly coupled symmetric multiprocessor system such as data processing system 102 in the exemplary embodiment, each processor 104a–104n may be utilized to read from and write to memory 110. Thus, systems and interlocks must be utilized to ensure that the data and instructions within memory 110 remain coherent.

Each processor 104a–104n within multiprocessor data processing system 102 includes a cache 106a–106n which may be utilized to efficiently and temporarily access and store selected instructions or data from system memory 110. Since each cache memory 112a–112n constitutes a memory space, coherency should be maintained among each cache memory 112a–112n and system memory 110 in order to assure accurate operation. Each cache 106a–106n is therefore connected to system bus 108 and snoops transactions on system bus 108.

Each cache 106a–106n also has an associated cache directory 114a–114n, which each store a plurality of cache directory entries corresponding to memory locations within cache memory 112a–112n. In the present invention, each cache 106a–106n supports partial interventions as described in further detail below.

Also connected to system bus 108 is system controller 116, which may control arbitration for system bus 108 and monitor transactions on system bus 108. System controller 116 includes an associated history directory 118 which contains data relating to the present and past status of each cache 106a–106n, which may include dynamic application sequence behavior information for cache lines within each cache 106a–106n as described in the related applications.

Figure 2:
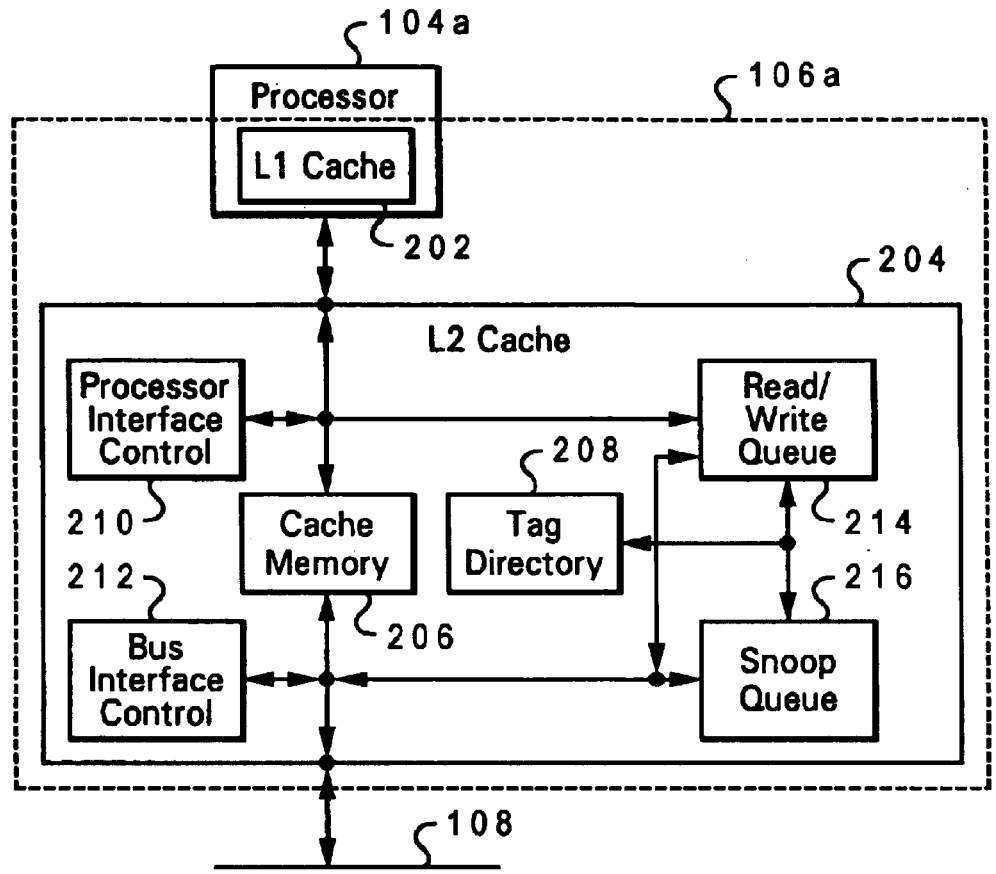
FIG. 2 is a block diagram of a portion of a specific implementation of a data processing system in accordance with a preferred embodiment of the present invention.

Referring to FIG. 2, a block diagram of a portion of a specific implementation of a data processing system in accordance with a preferred embodiment of the present invention is illustrated. The particular implementation of data processing system 102 illustrated in FIG. 2 includes a multilevel cache 106a including a level one (L1) cache 202 a level two (L2) cache 204. Although depicted as logically discrete, L1 and L2 caches 202 and 204 may be formed within a single integrated circuit die; however, L1 cache 202 is integrally formed with the functional elements of processor 104a while L2 cache 204 is a logically separate component.

L2 cache 204 includes a cache memory 206 and a cache (address tag) directory 208, as well as processor interface control logic 210 controlling communications transactions between cache 204 and processor 104a and bus interface control logic 212 controlling communications transactions between cache 204 and system bus 108. L2 cache 204 also includes a read/write queue 214 controlling processing of data access transactions received from processor 104a within cache 204 and a snoop queue 216 controlling processing of data access transactions snooped from system bus 108 within cache 204. Processor interface control logic 210, bus interface control logic 212, read/write queue 214, and snoop queue 216 may be collectively viewed as a cache controller for L2 cache 204.

Figure 3A:
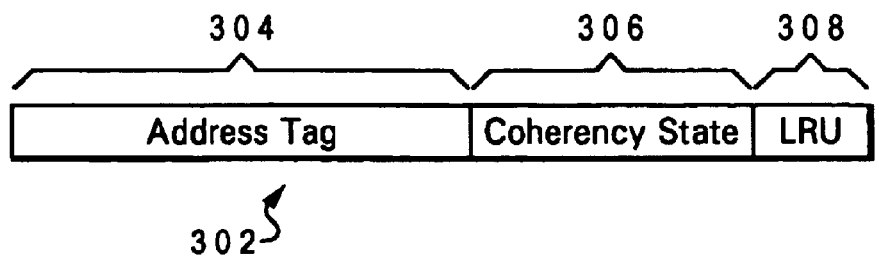

With reference now to FIGS. 3A through 3C, comparative diagrams of cache and history directory entries in accordance with the prior art and in accordance with the present invention are depicted. The data structures depict cache directory entries within L2 cache directory 204 or history directory 118 within system controller 116.

FIG. 3A depicts a prior art cache directory entry format 302 for each cache line within a cache directory 208, which includes: an address tag 304, typically some subset of address bits from the system memory address for the corresponding cache line; coherency state bits 306, which identify a coherency state for the corresponding cache line; and, optionally, LRU bits 308, which identify, within a set-associative cache, the LRU position of the corresponding cache line within the congruence class indexed by the address tag.

Because each processor within a multi-processor system may modify data, such systems must generally employ a protocol to maintain memory coherence. For example, multi-processor systems utilizing processors based upon the PowerPC RISC instruction set architecture (ISA) utilize a coherency protocol having four possible states: modified (M), exclusive (E), shared (S), and invalid (I). The MESI state 306 associated with each cache line (i.e., the line state) informs the data processing system as to what memory operations are required to maintain memory coherence following an access to that cache line.

As noted above, conventional LRU bits 308 within a cache directory entry represent the LRU position within a congruence class for the corresponding cache line. These LRU positions are employed by conventional LRU cache management algorithms to select a victim within a congruence class for deallocation.

FIG. 3B depicts a cache/history directory entry format 310 for each cache line within cache directory 208 in accordance with the present invention. Cache/history directory entry format 310 includes address tag 304, coherency state bits 306, and optional LRU bits 308. In addition, cache directory entry format 310 includes historical processor access, snoop operation, and system controller hint information 312, collected at each individual cache controller and passed on to each other.

The historical processor access, snoop operation, and system controller hint information 312 allows the cache controllers to track the operations performed on that cache line by the processors and caches. Historical processor access, snoop operation, and system controller hint information 312 includes an integer number m of subentries each containing information about a processor's access and/or snooping of the corresponding cache line, as well as system controller hints relating to the corresponding cache line. Subentry $T_0$ contains information regarding the most recent processor to access (and thereby gain either shared or exclusive "ownership" of) the corresponding cache line; subentry $T_{-1}$ contains information regarding the next most recent processor to access the corresponding cache line; subentry $T_{-2}$ contains information regarding the processor which accessed the corresponding cache line just prior to the processor of subentry $T_{-1}$; and so on, with subentry $T_{-m}$ containing information regarding the oldest available processor access information for any particular processor which previously accessed the corresponding cache line.

The number m of subentries $T_0$, $T_{-1}$, $T_{12}$, ... $T_{-m}$ within historical processor access and snoop operation information 312 may or may not correspond to the number of processors which share access to the corresponding cache 204. Each subentry $T_0$, $T_{-1}$, $T_{-2}$, ... $T_{-m}$ includes multiple segments: segments 314a, 314b, and 314c for subentry $T_0$; segments 316a, 316b, and 316c for subentry $T_{-1}$; segments 318a, 318b, and 318c for subentry $T_{-2}$; and segments 320a, 320b, and 320c for subentry $T_{-m}$. The first segments 314a, 316a, 318a and 320a contain historical processor access information regarding the corresponding cache line; the second segments 314b, 316b, 318b and 320b contain historical snoop operation information regarding the corresponding cache line; and the third segments 314c, 316c, 318c and 320c contain historical system controller hint information regarding the corresponding cache line.

The historical processor access information segments 314a, 316a, 318a and 320a of each subentry $T_0$, $T_{-1}$, $T_{-2}$, ... $T_{-m}$ contains an identification of the processor which accessed the cache line, an identification of each load or store type operation which was performed on the cache line by that processor, and a timestamp for each operation of when that operation was performed. The historical snoop operation information segments 314b, 316b, 318b and 320b of each subentry $T_0$, $T_{-1}$, $T_{-2}$, ... $T_{-m}$ contains an identification of each operation relating to the corresponding cache line which was snooped off the system bus by the respective processor, an identification the processor which originated the snooped operation, and a timestamp for each snooped operation of when that operation was snooped. The historical system controller hint information segments 314c, 316c, 318c and 320c of each subentry $T_0$, $T_{-1}$, $T_{-2}$, ... $T_{-m}$ contain an identification of each system controller hint received, and a timestamp for each received hint.

Thus, each subentry $T_0$, $T_{-1}$, $T_{-2}$, ... $T_{-m}$ may contain information regarding more than one access by the corresponding processor, as well as more than one snoop operation or system controller hint. Each subentry $T_0$, $T_{-1}$, $T_{-2}$, ... $T_{-m}$ may contain either a fixed or a variable number of storage locations for recording access (operation) types or snooped operation types and timestamps, with only information regarding the most recent accesses or snooped operations being maintained if a fixed or otherwise limited number of storage locations are provided.

With each new direct access of the corresponding cache line by a different processor, the content of all subentries are shifted by one position (e.g., the content of subentry $T_0$ is shifted into subentry $T_{-1}$, the content of subentry $T_{-1}$ is shifted into subentry $T_{-2}$, etc.) for the cache directory of the cache receiving the cache line. Information regarding the new processor access of the corresponding cache line is then stored within segment 314a of subentry $T_0$. If a processor reacquires a line which it had previously owned and then given up, the prior access is shifted just as if performed by a different processor and a new subentry $T_0$ is created for the current access by that processor.

Within the cache directory 208, information regarding system bus operations snooped by the same processor is stored within segment 314b of subentry $T_0$. Within the history directory 118, system bus operations snooped by the system controller 116 are stored within segment 314b of subentry $T_0$ in the cache directories, and in segment 324 (see FIG. 3C) in the system controller's history directory 118. If ownership of the corresponding cache line is shared among multiple processors/caches, snooped system bus operations and/or detected system controller hints may be written to corresponding $T_0$ subentries within the entry for that cache line in each cache controller which shares the cache line.

Within cache directory 208, processor access, snooped operation, and system controller hint information received from other processors or caches (e.g., via an intervention) are loaded into subentries $T_{-1}$ through $T_{-m}$ when the cache line/directory entry is first allocated within the processor/cache corresponding to subentry $T_0$.

FIG. 3C illustrates the format of directory entries within history table 118 in accordance with the present invention. The system controller (system bus controller) typically performs functions such as combining snoop responses, address bus arbitration, data bus arbitration, etc. In the present invention, the system controller 116 implements a history directory 118 in which historical bus sequences are logged on a per cache line basis. The history directory 118 may be either direct mapped or set associative.

The system controller's directory entry format 322 differs from the cache directory entry format 310. History directory entry format 322 includes the address tag 304 and a single log field 324. Just as each cache directory entry within cache directory 208 contains processor accesses and snooped operations detected by the cache controller, each directory entry within history directory 118 contains system a log of all system transactions—or at least those considered important by the system controller—detected by the system controller 116.

System controller 116 maintains within each entry in history directory 118 a log of all system bus transactions relating to the corresponding cache line, or at least those system bus transactions which are deemed important. Each recorded transaction includes:

a. the operation type (read, read with intent to modify, dclaim, etc);

b. the processor identifier for the processor which issued the transaction;

c. the individual responses to this transaction by snoopers;

d. the "hint" or guidance provided by the system controller within the combined response, if any; and f. "hint" generation algorithm updates (e.g., previous guesses determined to be wrong), if any.

Entries 322 within history directory 118 contain different information than entries 310 within cache directory 208. There exists some overlapping information, such as operation type, processor identifier, time stamps, and the hint provide. The system controller 116, however, has visibility to the individual snoop responses from each snooper, while snoopers do not see each other's responses, only the combined response. This additional information aids the system controller 116 in formulating the hints which it provides.

Additionally, history directory 118 may maintain its history of a given cache line when all of the caches have since evicted the line (assuming that the system controller's history directory 118 is able to hold many more entries than just the individual cache directories, taken alone or in combination). When the line is eventually requested by one of the caches, the system controller 116 provides its hint history to the requester, which may then be employed as a starting point to guide cache management as described in further detail below.

Figure 4A:
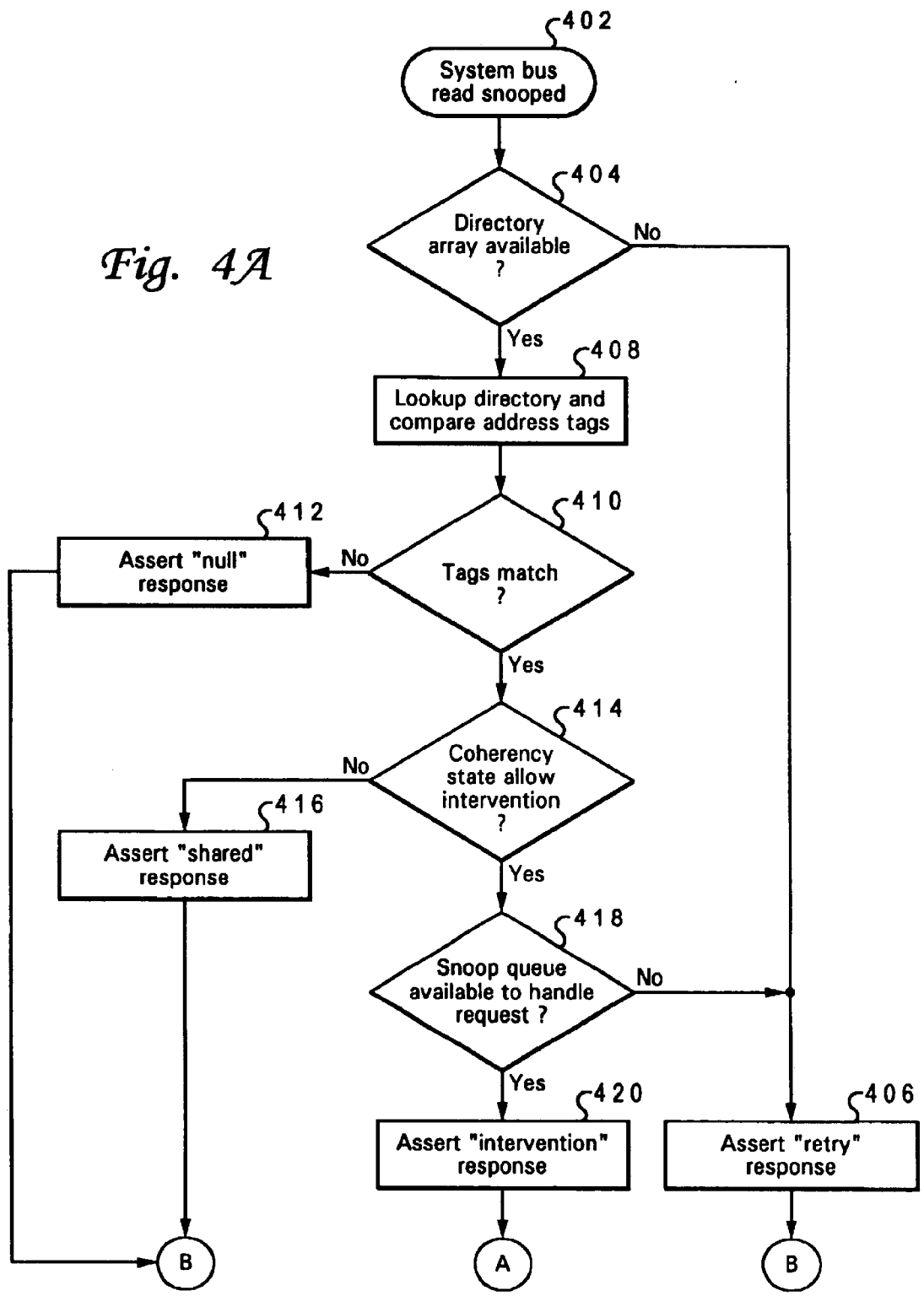
FIGS. 4A–4B are a high level flow chart for a process of performing a partial cache line intervention in accordance with the present invention.
Figure 4B:
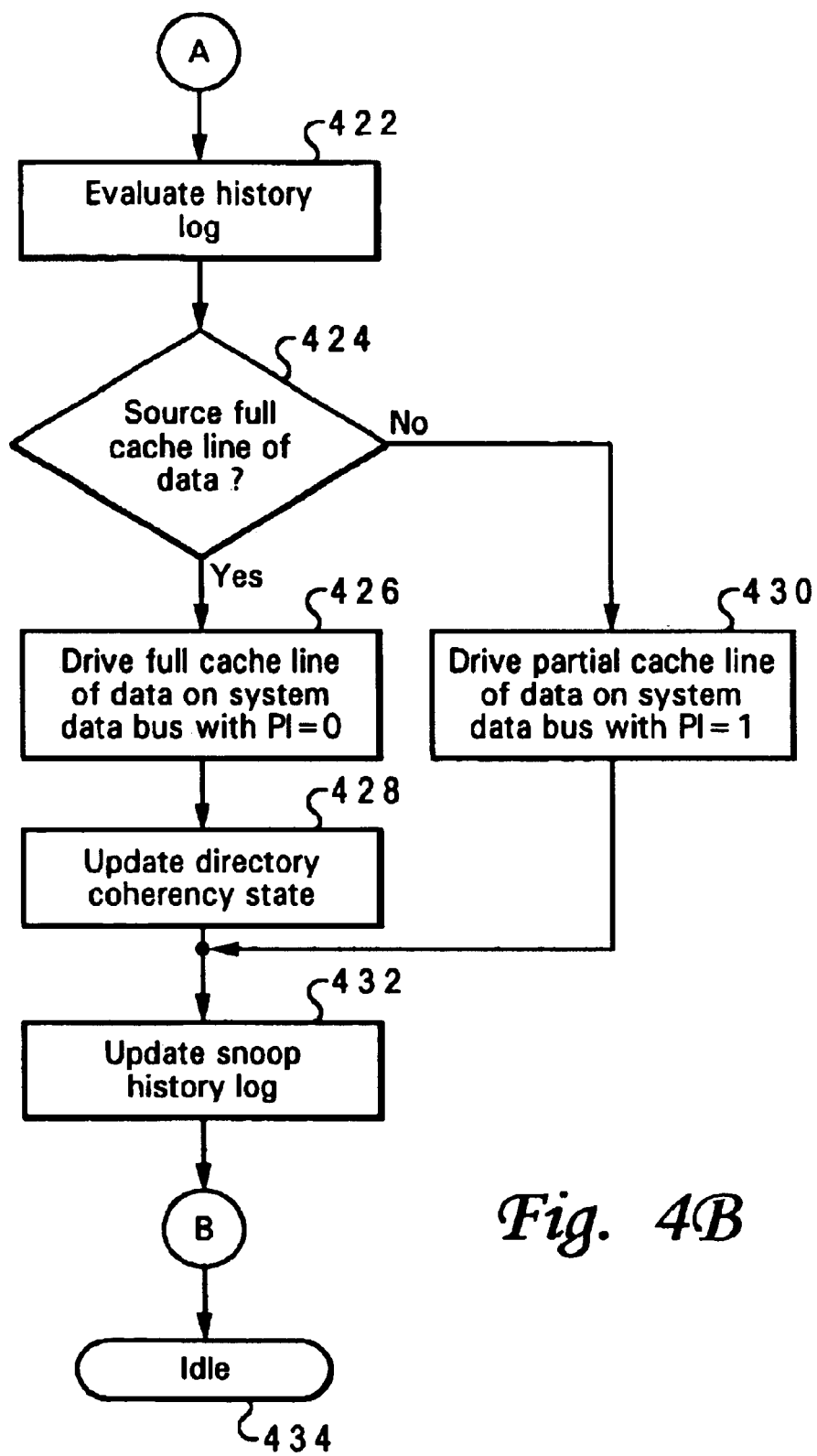

Referring to FIGS. 4A and 4B, a high level flow chart for a process of performing a partial cache line intervention in accordance with the present invention is illustrated. The process begins at step 402, which depicts a read operation being snooped off the system bus by a cache controller. The process first passes to step 404, which illustrates a determination of whether the directory array for the corresponding cache is available to look up the address for the snooped read operation. If not, the process proceeds to step 406, which depicts asserting a retry response.

If the directory array is available for an address lookup, the process proceeds instead to step 408, which illustrates performing an address lookup in the cache directory and comparing address tags with tags for data contained in the corresponding cache. The process next passes to step 410, which depicts a determination of whether a cache hit has occurred based on a match of the address tag from the snooped read operation with a tag in the cache directory. If not, the process proceeds to step 412, which illustrates asserting a null response to the snooped read operation.

If a cache hit occurs, however, the process proceeds instead to step 414, which depicts a determination of whether the coherency state for data within the cache allows or requires an intervention by the snooping cache. If not, the process proceeds to step 416, which illustrates asserting a "shared" response to the snooped read operation (assuming shared interventions are not supported), informing the bus master for the read operation that the cache contains the desired data in a shared coherency state.

If the coherency state allows or requires an intervention by the snooping cache (e.g., the snooping cache contains the requested data in an exclusive or modified coherency state), the process proceeds instead to step 418, which depicts a determination of whether any snoop queue is available to handle the snooped read request. If not, the process proceeds to step 406, and a retry response to the snooped read operation is asserted.

If a snoop queue is available, the process proceeds instead to step 420, which illustrates asserting an intervention response. The process then proceeds to step 422, which illustrates evaluating the history log for the cache line requested by the snooped read operation. The process then passes to step 424, which depicts a determination, based on the review of the history log for the cache line, of whether to source a full cache line or a partial cache line to the requesting cache.

With the present invention, more intelligence is added to the intervention protocol so that even if a requesting cache requests a full cache line of data, the intervening cache may assert a partial intervention, informing the requesting cache that only a granule (8 bytes) of data is being sent and not the entire cache line. Since the full cache line is not sent, the requested cache line cannot be cached by the requesting cache. Assuming that the data bus is eight bytes wide, the data may be sourced to the requesting cache in a single bus cycle (1 beat).

The intervening cache makes the determination of whether to send the full cache line or just the portion of the cache line which is actually needed based on the history information logged for that cache line. For example, if the intervening cache determines that there is a high likelihood that the processor which it supports (or some other processor besides the processor requesting the cache line) will require the requesting cache to invalidate the cache line soon after receipt, the intervening cache will only send the granule of data actually needed by the requesting processor. The benefits of this action include:

Less data bus bandwidth is used while satisfying the request with no latency penalty.

Since the requestor does not cache the data, subsequent invalidating type bus transactions require no snoop resource to be tied up within the requesting cache controller.

Since the requestor does not cache the data, there is one less snooper which might retry a subsequent bus operation addressing the same cache line.

If a full cache line of data is to be sourced by the intervening cache, the process proceeds to step 426, which illustrates driving a full cache line of data on the data bus. The requesting cache is informed of the amount of data being sent by a "partial intervention" (PI) bit which accompanies the first beat of valid data sourced from the intervening cache. If the partial intervention bit is set, the requesting cache knows that no more data is coming; if the partial intervention bit is not set, the requesting cache knows that a full cache line of data will be transferred. If a full cache line of data is to be sourced by the intervening cache, therefore, the partial intervention bit is not set.

The process then passes to step 428, which depicts updating the directory coherency state. If a full intervention occurs and the requesting cache will cache the data received, the snooper should update the coherency state associated with the corresponding cache line to reflect the existence of another copy. If only a partial intervention occurs, the requesting cache will not cache the requested cache line and the snooper need not update the coherency state for that cache line.

If only a portion of the full cache line is to be sourced by the intervening cache, however, the process proceeds instead to step 430, which illustrates driving a partial cache line of data on the system data bus with the partial intervention bit accompanying the first (and only) beat set. From either of steps 428 or 430, the process then passes to step 432, which depicts updating snoop history log entry for the cache line requested by the snooped read operation. The process then passes to step 434, which illustrates the process becoming idle until another access is snooped on the system bus.

The present invention allows an intervening cache to source only the portion of a requested cache line which is actually needed. Since less than a full cache line is provided, the data will not be cached within the requesting cache. In this manner, data bus bandwidth is preserved, the need to subsequently invalidate the cache line within the requesting cache is avoided, and the likelihood of a subsequent operation requiring invalidation of the cache line being retried is reduced.

While the invention has been particularly shown and described with reference to a preferred embodiment, it will be understood by those skilled in the art that various changes in form and detail may be made therein without departing from the spirit and scope of the invention.

What is claimed is:

1. A method of performing an intervention, said method comprising:

in response to a caching device snooping a data access request initiated by a requesting device, said data access request identifying a data block of requested data that said caching device holds in a valid coherency state, said caching device:
(1) determining whether said caching device is required or permitted to supply said requested data to said requesting device by data intervention, and
(2) selecting either a full intervention in which all of said data block of requested data will be transmitted or a partial intervention in which only a partial data block of said requested data will be transmitted, wherein said selecting includes selecting partial intervention responsive to determining at least one of:
(a) that the requesting device is likely to be required to invalidate the requested data soon after receipt, or
(b) that the requesting device should not cache the requested data;
responsive to selection of a full intervention, transmitting the full data block of requested data from said caching device to the requesting device; and
responsive to selection of a partial intervention, transmitting only the partial data block of requested data from the caching device to the requesting device.

2. The method of claim 1, wherein said transmitting only a partial data block further comprises:
transmitting only a portion of the data block actually needed by the requesting device.

3. The method of claim 1, wherein said transmitting only a partial data block further comprises:
setting a partial intervention bit transmitted with the partial data block.

4. A method of performing an intervention, said method comprising:
in response to a caching device snooping a data access request initiated by a requesting device, said data access request identifying a data block of requested data that said caching device holds in a valid coherency state, said caching device:
(1) determining whether said caching device is required or permitted to supply said requested data to said requesting device by data intervention, and
(2) selecting either a full intervention in which all of said data block of requested data will be transmitted or a partial intervention in which only a partial data block of said requested data will be transmitted;
responsive to selection of a full intervention, transmitting the full data block of requested data from said caching device to the requesting device, wherein transmitting the full data block further includes transmitting a partial intervention bit with a first beat of the full data block, wherein a state of said partial intervention bit indicates that the full data block will be transmitted by the caching device; and
responsive to selection of a partial intervention, transmitting only the partial data block of requested data from the caching device to the requesting device.

5. A method of handling data transmission between two caches, said method comprising:
snooping, within the first cache, the data access request initiated by the second cache on the system interconnect coupling the first and second caches;
determining whether a directory array within the first cache is available;
responsive to determining that the directory array within the first cache is not available, returning a retry response to the data access request;
responsive to determining that the directory array within the first cache is available, determining whether an address tag within the data access request matches any address tag within the directory array;
responsive to determining that the address tag within data access request does not match any address tag within the directory array, returning a null response to the data access request;
responsive to determining that the address tag within data access request matches an address tag within the directory array, determining whether a snoop queue within the first cache is available to handle an intervention;
responsive to determining that the snoop queue within the first cache is not available to handle an intervention, returning a retry response to the data access request;
responsive to determining that the snoop queue within the first cache is available to handle an intervention, returning an intervention response to the data access request;
after returning an intervention response to the data access request, evaluating a history log for the data block requested by the data access request to determine whether to source the full data block;
responsive to determining that a full data block that a first cache holds in a valid coherency state should be sourced in a data intervention from the first cache snooping a data access request to a second cache initiating the data access request, said first cache driving the full data block on a system interconnect coupling the first and second caches together with a intervention bit having a first state indicative of a full intervention; and
responsive to determining that the full data block should be not sourced in the intervention, said first cache driving only a partial data block on the system interconnect together with a intervention bit having a different second state indicative of a partial intervention.

6. The method of claim 5, further comprising:
transmitting the intervention bit with a first beat of data sourced by the first cache.

7. The method of claim 6, further comprising:
receiving, within the second cache, the data sourced by the first cache;
receiving, within the second cache, the intervention bit accompanying the first beat of data sourced by the first cache;
responsive to detecting that the intervention bit is not set, receiving additional beats of data within the second cache until the full data block is received and caching the data block; and
responsive to detecting that the intervention bit is set, forwarding the first beat of data to a processor without caching.

8. The method of claim 5, wherein said evaluating a history log further comprises:
determining whether the first cache is likely to require the second cache to invalidate the requested data soon after the second cache receives the requested data; and
determining whether the second cache is likely to need a portion of the data block other than a specifically requested portion.

9. A method of performing an intervention, said method comprising:
in response to a caching device snooping a data access request initiated by a requesting device, said data access request identifying a data block of requested data that said caching device holds in a valid coherency state, said caching device:
  (1) determining whether said caching device is required or permitted to supply said requested data to said requesting device by data intervention, and
  (2) selecting either a full intervention in which all of said data block of requested data will be transmitted or a partial intervention in which only a partial data block of said requested data will be transmitted, wherein said selecting includes selecting either a full intervention or a partial intervention by reference to a history log associated with the data block;
responsive to selection of a full intervention, transmitting the full data block of requested data from said caching device to the requesting device; and
responsive to selection of a partial intervention, transmitting only the partial data block of requested data from the caching device to the requesting device.

10. A method of handling data transmission between two caches, said method comprising:
  in response to a first cache snooping a data access request by a second cache initiating the data access request, said first cache determining, by reference to a history log associated with a data block that the first cache holds in a valid coherency state, whether a full data block or a partial data block should be sourced in a data intervention from the first cache to the second cache;
  responsive to determining that a full data block that a first cache holds in a valid coherency state should be sourced in a data intervention from the first cache snooping a data access request to a second cache initiating the data access request, said first cache driving the full data block on a system interconnect coupling the first and second caches together with a intervention bit having a first state indicative of a full intervention; and
  responsive to determining that the full data block should be not sourced in the data intervention, said first cache driving only a partial data block on the system interconnect together with a intervention bit having a different second state indicative of a partial intervention.

11. A data processing system, comprising:
  a caching device and a requesting device coupled to a system interconnect for communication therebetween;
  means within the caching device, responsive to snooping a data access request from the requesting device on the system interconnect, said data access request identifying a data block of requested data that said caching device holds in a valid coherency state, for (1) determining whether said caching device is required or permitted to supply said requested data to said requesting device by data intervention and (2) for selecting either a full intervention in which all of said data block of requested data will be transmitted or a partial intervention in which only a partial data block of requested data will be transmitted, wherein said means for selecting includes means for selecting partial intervention responsive to determining at least one of:
    (a) that the requesting device is likely to be required to invalidate the requested data soon after receipt, or
    (b) that the requesting device should not cache the requested data;
  means within the caching device, responsive to selection of a full intervention, for transmitting the full data block of said requested data to the requesting device; and
  means within the caching device, responsive to selection of a partial intervention, for transmitting only a partial data block of said requested data to the requesting device.

12. The data processing system of claim 11, wherein the means for transmitting only a partial data block further comprises:
  means for transmitting only a portion of the data block actually needed by the requesting device.

13. The data processing system of claim 11, wherein the means for transmitting only a partial data block further comprises:
  means for setting a partial intervention bit transmitted to the requesting device with the partial data block.

14. A data processing system, comprising:
  a caching device and a requesting device coupled to a system interconnect for communication therebetween;
  means within the caching device, responsive to snooping a data access request from the requesting device on the system interconnect, said data access request identifying a data block of requested data that said caching device holds in a valid coherency state, for (1) determining whether said caching device is required or permitted to supply said requested data to said requesting device by data intervention and (2) for selecting either a full intervention in which all of said data block of requested data will be transmitted or a partial intervention in which only a partial data block of requested data will be transmitted;
  means within the caching device, responsive to selection of a full intervention, for transmitting the full data block of said requested data to the requesting device, wherein the means for transmitting the full data block further includes means for transmitting a partial intervention bit with a first beat of the full data block, wherein a state of said partial intervention bit indicates that the full data block will be transmitted by the caching device; and
  means within the caching device, responsive to selection of a partial intervention, for transmitting only a partial data block of said requested data to the requesting device.

15. The data processing system of claim 11, further comprising:
  means within the requesting device, responsive to detecting that the partial intervention bit transmitted by the caching device is not set, for receiving additional beats of the data block.

16. The data processing system of claim 13, further comprising:
  means within the requesting device, responsive to detecting that the partial intervention bit transmitted by the caching device is set, for forwarding the partial data block to a processor without caching the partial data block.

17. A data processing system, comprising:
  a caching device and a requesting device coupled to a system interconnect for communication therebetween;
  means within the caching device, responsive to snooping a data access request from the requesting device on the system interconnect, said data access request identifying a data block of requested data that said caching device holds in a valid coherency state, for (1) determining whether said caching device is required or permitted to supply said requested data to said requesting device by data intervention and (2) for selecting either a full intervention in which all of said data block of requested data will be transmitted or a partial intervention in which only a partial data block of requested data will be transmitted;

means within the caching device, responsive to selection of a full intervention, for transmitting the full data block of said requested data to the requesting device;

means within the caching device, responsive to selection of a partial intervention, for transmitting only a partial data block of said requested data to the requesting device; and means within the caching device for updating a coherency state for the data block following a full intervention but not updating the coherency state following a partial intervention.

18. A data processing system, comprising:

a caching device and a requesting device coupled to a system interconnect for communication therebetween;

means within the caching device, responsive to snooping a data access request from the requesting device on the system interconnect, said data access request identifying a data block of requested data that said caching device holds in a valid coherency state, for (1) determining whether said caching device is required or permitted to supply said requested data to said requesting device by data intervention and (2) for selecting either a full intervention in which all of said data block of requested data will be transmitted or a partial intervention in which only a partial data block of requested data will be transmitted;

means within the caching device, responsive to selection of a full intervention, for transmitting the full data block of said requested data to the requesting device; and means within the caching device, responsive to selection of a partial intervention, for transmitting only a partial data block of said requested data to the requesting device;

wherein said caching device includes a history log associated with the data block, and wherein said means for selecting comprises means for selecting either a full intervention or a partial intervention by reference to said history log.

19. A caching device, comprising:

a cache memory array;

a cache directory of contents of said cache memory array;

cache control circuitry, including:

snoop logic that, responsive to snooping a data access request from a requesting device on the system interconnect, said data access request identifying a data block of requested data that said caching memory array holds in a valid coherency state, for (1) determining whether said caching device is required or permitted to supply said requested data to said requesting device by data intervention and (2) for selecting either a full intervention in which all of said data block of requested data will be transmitted or a partial intervention in which only a partial data block of requested data will be transmitted;

means, responsive to selection of a full intervention, for transmitting the full data block of said requested data to the requesting device; and means, responsive to selection of a partial intervention, for transmitting only a partial data block of said requested data portion of the cache line to the requesting device, wherein said caching device further comprises a history log associated with the data block, and wherein said snoop logic selects either a full intervention or a partial intervention by reference to said history log.

* * * * *

UNITED STATES PATENT AND TRADEMARK OFFICE
CERTIFICATE OF CORRECTION

PATENT NO. : 6,763,433 B1
APPLICATION NO. : 09/696910
DATED : July 13, 2004
INVENTOR(S) : Arimilli et al.

It is certified that error appears in the above-identified patent and that said Letters Patent is hereby corrected as shown below:

In Col. 5, line 15, please replace "The number $m$ of subentries $T_0, T_{-1}, T_{12}, \ldots T_{-m}$ within" with the following:

-- The number $m$ of subentries $T_0, T_{-1}, T_{-2}, \ldots T_{-m}$ within --.

In Col. 12, claim 15., please correct "of claim 11" to read: -- of claim $\underline{14}$ --.

In Col. 12, claim 16., please correct "of claim 13" to read: -- of claim $\underline{14}$ --.

Signed and Sealed this

Twenty-third Day of October, 2007

JON W. DUDAS
*Director of the United States Patent and Trademark Office*